May 3, 1949.　　　　W. L. BULKLEY　　　　2,469,153
ABSORPTION REFRIGERATING SYSTEM
Filed Dec. 27, 1944
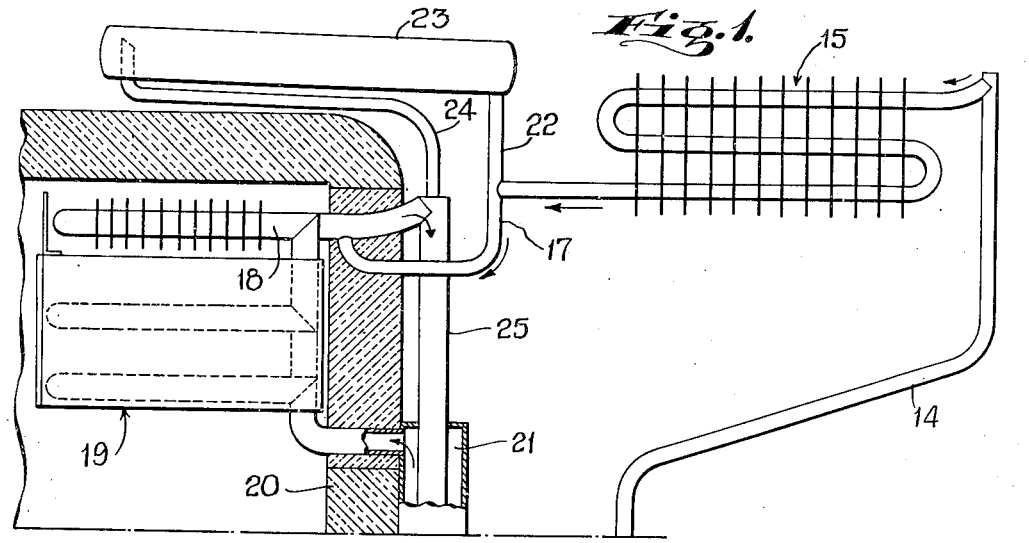
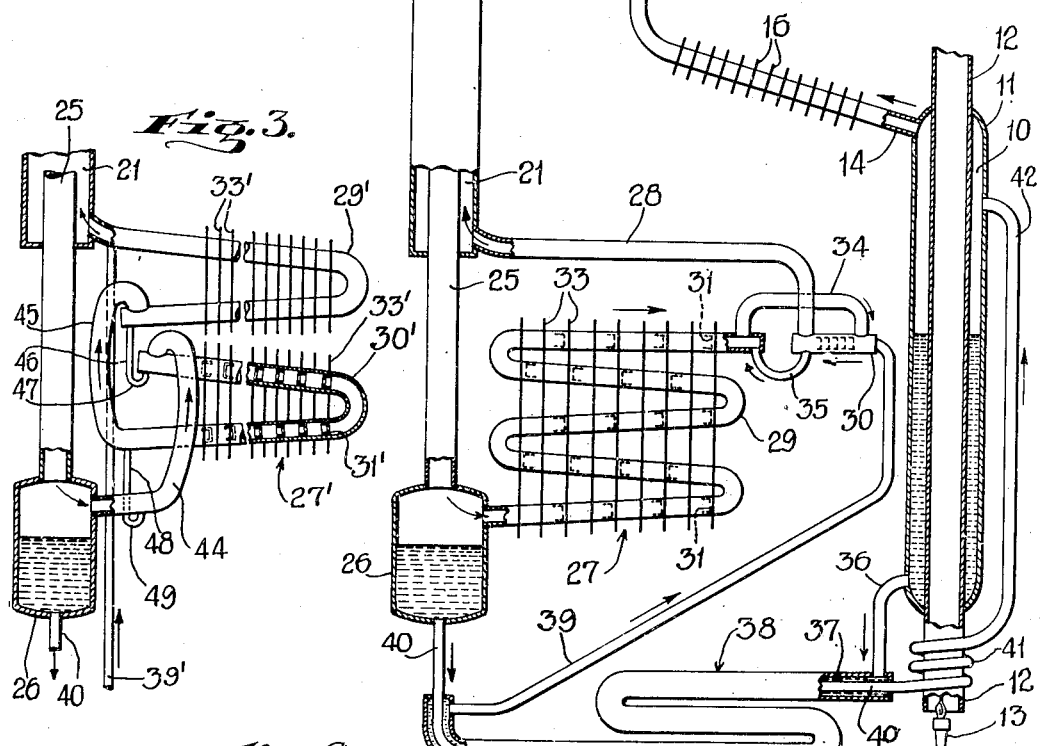
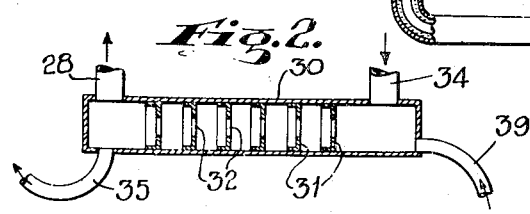
INVENTOR
William L. Bulkley
BY
J. C. Kelly
ATTORNEY Patented May 3, 1949

2,469,153

UNITED STATES PATENT OFFICE 2,469,153

ABSORPTION REFRIGERATING SYSTEM

William L. Bulkley, Evansville, Ind., assignor to Servel, Inc., New York, N. Y., a corporation of Delaware Application December 27, 1944, Serial No. 569,937

2 Claims. (Cl. 62—119.5)

My invention relates to refrigeration. More particularly, my invention relates to unipressure absorption refrigerating systems wherein an inert pressure-equalizing gas circulates between an evaporator and an absorber by gravity.

Gravity circulation of the inert pressure-equalizing gas in this type of system is caused by the fact that the gas circuit between the evaporator and the absorber contains two columns of gas of unequal specific weight. One column contains inert gas weak in refrigerant and is relatively light; the other column contains inert gas rich in refrigerant and is relatively heavy. The heavy column over-balances the light column, which causes the rich gas to flow downward from the evaporator toward the absorber, and the weak gas to flow upward from the absorber toward the evaporator. It sometimes happens that in the starting of such a system, the inert pressure-equalizing gas circulates in a direction opposite to or the reverse of that intended.

When a unipressure absorption refrigerating system is first charged with a refrigerant-absorbent solution and a pressure-equalizing gas, or after such a system has been standing idle for an appreciable time, the evaporator, absorber, and interconnected conduits forming the gas circuit all contain a gas of substantially the same composition. Therefore, when such a system is put into operation the circulation of gas between the evaporator and the absorber may start in a reverse or wrong direction. Various theories and reasons have been advanced from time to time as to the cause of this reverse flow of the pressure-equalizing gas. However, it has been found that under certain conditions, in starting a gravity flow system wherein it is intended that absorption solution flow downward through the absorber in contact with rich gas flowing upward therethrough, a surge of absorption solution into the upper part of the absorber may cause the gas to flow downward with the absorption solution instead of upward. This is particularly true when the counter-flow absorber is provided with flow restrictors.

It is, therefore, an object of my invention to provide a unipressure absorption refrigerating system wherein the circulation of pressure-equalizing gas is initiated and maintained in a correct and predetermined direction.

My invention, together with its objects and advantages, is more fully set forth in the following description and accompanying drawings, wherein like reference characters are used to designate like parts throughout, and wherein:

Fig. 1 diagrammatically illustrates a refrigerating apparatus incorporating one embodiment of my invention;

Fig. 2 is an enlarged sectional view through a part of an absorber incorporating my invention; and Fig. 3 diagrammatically illustrates a second embodiment of my invention.

Referring now to Figs. 1 and 2 of the drawing, wherein a preferred embodiment of my invention is illustrated, my improved refrigerating apparatus includes a generator 10 having an outer shell 11 through which extends a flue 12 which is arranged to be heated in any suitable manner, as for instance by a gas burner 13. A conduit 14 connects the upper part of the generator to the inlet end of an air-cooled condenser 15. Heat transfer fins 16 are preferably secured to conduit 14 in order to provide an air-cooled rectifier. The lower or outlet end of condenser 15 is connected by a conduit 17 with the upper end of a pipe coil 18 of a cooling unit or evaporator 19. Evaporator 19 is disposed within a refrigerator cabinet 20. The lower end of evaporator coil 18 is connected to the upper end of an outer gas heat exchanger passage 21. The outlet end of condenser 15 is also connected by a conduit 22, a pressure vessel 23, and a conduit 24, to an inner heat exchanger conduit 25 of the gas heat exchanger. Refrigerant vapor not liquefied in the condenser flows through conduit 22 into pressure vessel 23 displacing inert gas in said vessel and forcing said gas through conduit 24 into the gas circuit, thereby increasing the total pressure in the entire system to insure condensation of refrigerant vapor without interrupting refrigeration. The upper end of heat exchanger conduit 25 is connected to the upper or rich gas portion of evaporator coil 18, and the lower end of this heat exchanger conduit is connected to the upper portion of a vessel 26, which in turn is connected to the lower end of an absorber 27. The upper end of the absorber is connected by a conduit 28 to the lower end of gas heat exchanger passage 21.

Absorber 27 includes a plurality of interconnected sections 29 and 30. Each of absorber sections 29 and 30 is provided with a plurality of flow restrictors 31, each having an orifice 32 therein. As shown, the flow restrictors of absorber section 30 are spaced closer to each other than those of absorber section 29. Therefore, flow resistance per unit length of the absorber is higher in section 30 than in section 29. Also, the resistance of section 30 per unit length may be made higher than that of section 29 by providing smaller orifices in the flow restrictors of section 30. Section 29 may, therefore, be termed a low resistance section, and section 30 a high resistance section. Absorber section 29 is provided with heat transfer fins 33. A gas conduit 34 and a liquid conduit 35 connect absorber sections 29 and 30, as will be described in more detail hereinafter. A conduit 36 connects the lower portion of generator shell 11 to the outer passage 37 of a liquid heat exchanger 38, and a conduit 39 connects the passage 37 with absorber section 30. A conduit 40, which forms the inner passage of liquid heat exchanger 38, connects the lower portion of vessel 26 to a coil 41 which is in intimate heat transfer relation with the lower portion of generator flue 12. The upper end of coil 41 is connected by a conduit 42 with the upper portion of generator shell 11.

The operation of the above-described apparatus is as follows: Assume that the apparatus has been charged with a refrigerant-absorbent solution such as ammonia and water, and with an inert pressure-equalizing gas such as hydrogen. Assume further that the apparatus is being put into operation for the first time, or that it is being put into operation after having been idle for an appreciable time. In other words, the gas in the different parts of the gas circuit is dormant and is of substantially the same composition. The application of heat to the refrigerant-absorbent solution in the generator causes expulsion of refrigerant vapor therefrom which flows through conduit 14 to the inlet end of condenser 15. The refrigerant vapor is liquefied in the condenser and flows from the outlet end thereof through conduit 17 into the upper end of evaporator coil 18. However, as heat is applied to the refrigerant-absorbent solution in the generator, heat is simultaneously applied to the refrigerant-absorbent solution in the coil 41. The application of heat to the solution in this coil raises the solution through conduit 42 by thermosiphonic action to the upper part of generator shell 11, which action causes circulation of solution between the generator and the absorber. Weak solution; that is, absorption solution weak in refrigerant, flows from the lower part of generator shell 11, through conduit 36, outer passage 37 of the liquid heat exchanger, and conduit 39, into absorber section 30. This weak solution flows through this section of the absorber and, due to the relatively high resistance to flow offered by the flow restrictors, tends to push pressure-equalizing gas through this section of the absorber and into conduit 28. This action starts the circulation of the pressure-equalizing gas from absorber section 30 into conduit 28, through gas heat exchanger passage 21, into and upward through the evaporator, into and downward through inner gas heat exchanger conduit 25, through the upper part of vessel 26, and into the lower end of absorber section 29.

The weak solution which has passed through absorber section 30 flows into conduit 35 and from there into the upper end of absorber section 29. From there the solution flows downward through absorber section 29 in counter-flow relation with the up-flowing pressure-equalizing gas. The circulation of the pressure-equalizing gas having been started in the proper direction through the gas circuit, liquid refrigerant entering the upper end of evaporator coil 18, flows downward therethrough in counter-flow relation with the circulating pressure-equalizing gas. The liquid refrigerant evaporates and diffuses into the pressure-equalizing gas, thereby producing the desired refrigerating effect. The enriched gas flows from the upper part of the evaporator, downward through heat exchanger conduit 25 into and upward through the absorber, as previously explained, where the downflowing absorption solution strips the pressure-equalizing gas of the refrigerant. The strong absorption solution flows from the absorber into vessel 26, and through conduit 40, coil 41, and conduit 42 back to the generator.

Referring now to Fig. 3 of the drawing, wherein a second embodiment of my invention is illustrated, 27' designates generally an absorber including an upper or low resistance section 29' and a lower or high resistance section 30', each of which is provided with heat transfer fins 33'. Low resistance absorber section 29' is free of flow restrictors, while high resistance absorber section 30' is provided with flow restrictors 31', generally similar to flow restrictors 31 of Figs. 1 and 2. A conduit 44 conveys rich inert pressure-equalizing gas from the upper portion of vessel 26 to the upper end of absorber section 30' for downward flow therethrough. A conduit 45 conveys pressure-equalizing gas from the lower portion of absorber section 30' to the lower portion of absorber section 29' for upward flow therethrough. The upper or gas outlet end of absorber section 29' is connected to the lower portion of gas heat exchanger passage 21. A conduit 39' conveys weak absorption liquid to the upper end of absorber section 29' for downward flow through said section, and a conduit 46, provided with a liquid trap 47, connects the lower end of absorber section 29' to the upper end of absorber section 30'. A conduit 48, provided with a liquid trap 49, connects the lower end of absorber section 30' to conduit 44 for flow of strong absorption solution into vessel 26. As shown, and as stated above, low resistance absorber section 29' is free of flow restrictors. However, if desired, flow restrictors may be used in this section of the absorber so long as the total resistance of this section is appreciably lower than that of high resistance section 30'.

Also, if flow restrictors are used in low resistance section 29', they should be located an appreciable distance from the weak absorption liquid inlet, so that surging of said liquid into the absorber will not force the pressure-equalizing gas in the wrong direction.

The operation of this second embodiment of my invention is generally similar to that of the preferred embodiment illustrated in Figs. 1 and 2, except that with this second embodiment weak absorption solution from the generator flows through conduit 39' into the upper part of low resistance absorber section 29' and downward therethrough in counter-flow relation with up-flowing pressure-equalizing gas. From the lower end of absorber section 29' absorption liquid flows through conduit 46 and liquid trap 47 into the upper end of high resistance absorber section 30' and downward therethrough in concurrent relation with rich inert pressure-equalizing gas which flows into the upper end of this absorber section from conduit 44. This downward flow of absorption liquid through the high resistance section of the absorber tends to push the pressure-equalizing gas ahead of it, thereby initiating the flow of said gas between the absorber and the evaporator in a correct and predetermined direction. Inert pressure-equalizing gas flows from the lower portion of absorber section 30' through conduit 45 into the lower portion of absorber section 29'. It is to be noted that the weak absorption liquid from the generator enters the absorber at the point where the lean inert pressure-equalizing gas leaves the absorber, thereby taking advantage of having the liquid and gas substantially in equilibrium at this point. Also with this arrangement, the counter-flow relation of the liquid and gas through the low resistance section of the absorber offers only nominal resistance to flow of each of these media and does not appreciably interfere with the circulation of gas which has been started by downward flow of absorption solution through the high resistance section of the absorber.

In the description of the operation of each of the refrigerating apparatus incorporating my invention, it has been assumed that the apparatus has been standing idle, or that it is being started for the first time. However, with each of my improved absorbers, correct circulation of pressure-equalizing gas is insured under all usual conditions of operation of the refrigerating apparatus. If, for example, after a refrigerating apparatus has been operating with the gas burner on minimum input for a prolonged period of time, as during a defrosting period, at which time gas circulation may have substantially stopped, occurrence of an increased demand for refrigeration may cause a sudden surge of weak solution into the upper section of the absorber which, with a conventional counter-flow absorber, may cause reverse flow of the pressure-equalizing gas in the gas circuit. On the other hand, with my absorber illustrated in Fig. 1, a surge of weak solution into the absorber, no matter from what cause, will be in the desired direction of circulation of the pressure-equalizing gas and thereby obviate reversals of said circulation. Also, a surge of absorption liquid into the low resistance portion of the absorber illustrated in Fig. 3 will have no appreciable effect upon the flow of gas through the apparatus; whereas the flow of absorption liquid through the high resistance portion of this absorber causes the gas to flow in the desired direction.

While I have illustrated and described two specific embodiments of my invention, it obviously may take other forms and be variously applied within the scope of the following claims.

What I claim is:

1. An absorption type refrigerating system having a circuit for gravity circulation of inert gas including an evaporator and an absorber, and a circuit for absorption liquid including said absorber and a generator, said evaporator having a low temperature freezing section and a higher temperature air cooling section, said absorber being constructed and arranged for flow of gas therethrough unobstructed by liquid flowing therein, one section of said absorber having a greater resistance to gas flow therethrough than other sections of the absorber, and said circuits being so constructed and arranged that liquid first enters said absorber through said high resistance section and flows only concurrent with the gas in this section but countercurrent with gas in the other sections, the direction of flow in said high resistance absorber section being such that circulation of gas in the gas circuit involves flow of gas from said evaporator freezing section to said evaporator air cooling section.

2. A refrigerating system as set forth in claim 1 in which said absorber comprises tubing of substantially uniform diameter, and the higher resistance of said high resistance section is produced by baffles provided as inserts in said tubing.

WILLIAM L. BULKLEY.

REFERENCES CITED

The following references are of record in the file of this patent:

UNITED STATES PATENTS

| Number | Name | Date |
|---|---|---|
| 1,791,441 | Bertsch | Feb. 3, 1931 |
| 2,156,908 | Babcock | May 2, 1939 |
| 2,229,687 | Thomas | Jan. 28, 1941 |
| 2,368,374 | Nelson | Jan. 30, 1945 |

FOREIGN PATENTS

| Number | Country | Date |
|---|---|---|
| 540,538 | Great Britain | Jan. 29, 1932 |